Figure 1:
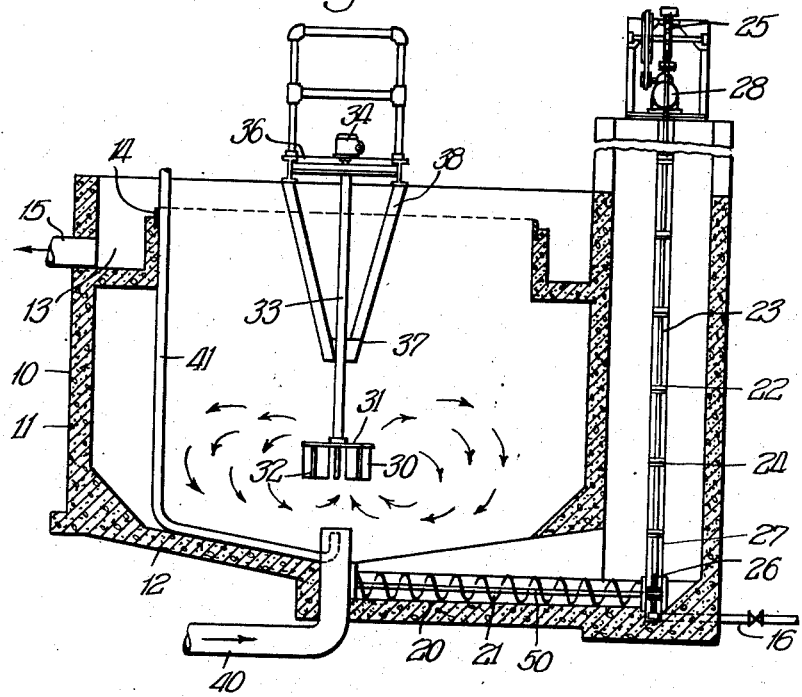

May 18, 1954

A. A. KALINSKE ET AL
APPARATUS FOR SEPARATING GRIT
AND GREASE FROM WASTE WATERS 2,678,912

Filed Nov. 4, 1949

2 Sheets-Sheet 1

INVENTORS
Anton A. Kalinske,
BY Herbert W. Gillard,
J. Gurvz
agent.

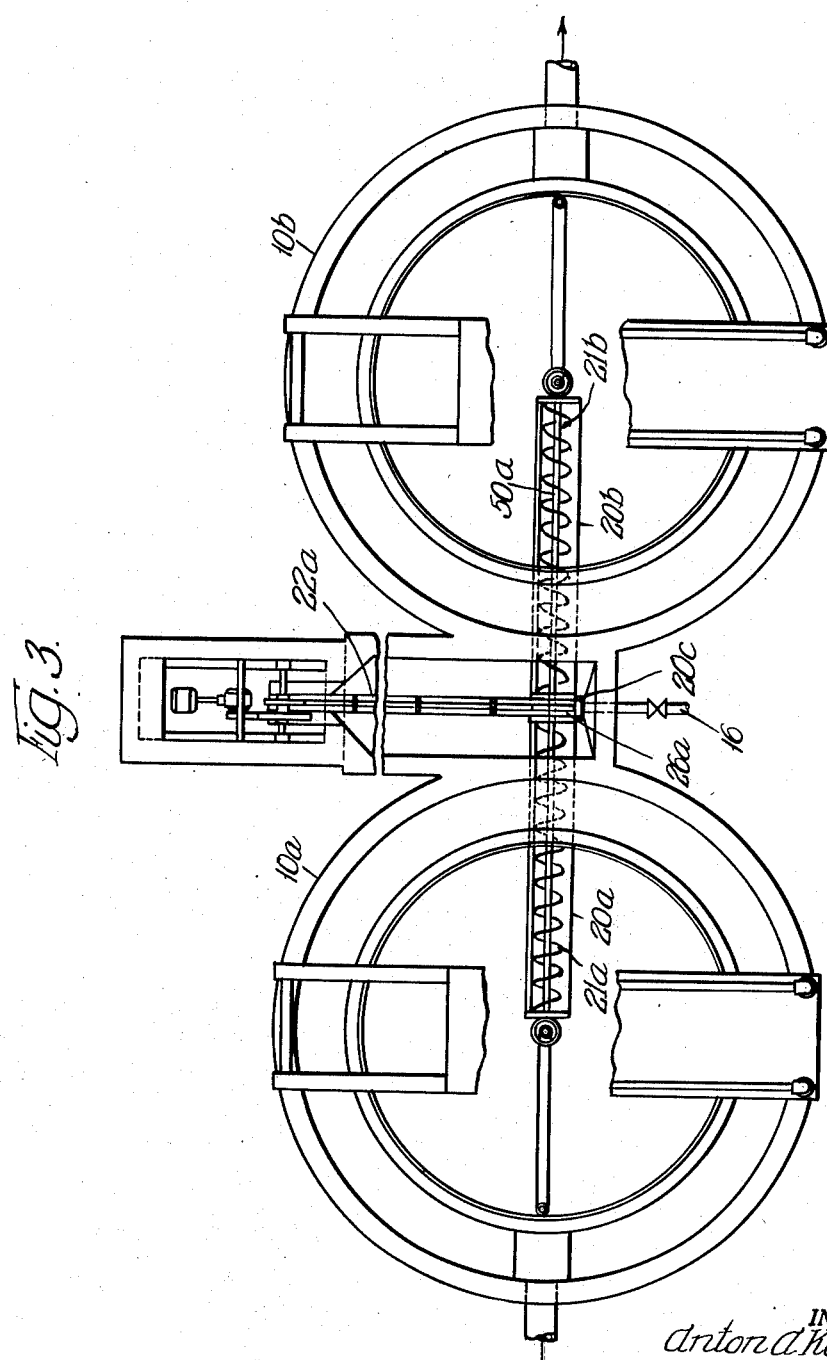

Patented May 18, 1954

2,678,912

UNITED STATES PATENT OFFICE 2,678,912

APPARATUS FOR SEPARATING GRIT AND GREASE FROM WASTE WATERS

Anton A. Kalinske, Elmhurst, and Herbert W. Gillard, Oak Park, Ill., assignors to Infilco Incorporated, Chicago, Ill., a corporation of Delaware Application November 4, 1949, Serial No. 125,576

4 Claims. (Cl. 210—3)

This invention relates to the treatment of sewage and more particularly to the separation of grit and grease from sewage and the simultaneous coagulation of organic solids in the sewage.

The term "sewage" is used herein in a broad sense to denote polluted liquids carrying appreciable quantities of grit and grease, such as domestic sewage, mixtures of domestic sewage and other liquid wastes and the like.

It is an object of this invention to provide a simple and efficient apparatus for separating grit and grease from sewage.

Another object of this invention is to provide an apparatus for grit and grease removal wherein the grit is allowed to settle from the sewage, grease and oil are floated to, and accumulated at, the surface of a body of sewage, while the balance of the organic material is retained in the sewage and subjected under aerobic conditions to agitation favorable for coagulation.

Another object is to provide an apparatus for separating grit and grease from sewage in a manner to permit their subsequent removal by simple mechanical means, and for simultaneously coagulating and agglomerating organic solids in the sewage to improve their settleability.

Another object is to provide a grit and grease removal chamber which permits operation under constant velocity conditions irrespective of variations in the sewage flow.

Another object is to provide a combination of two grit chambers with a common grit removing mechanism.

Other objects of the invention will become apparent from a consideration of the description and claims which follow.

Raw sewage entering a treatment plant ordinarily carries inorganic material, such as metal pieces, sand, cinders and the like, commonly spoken of as grit. It is necessary to remove the grit from the sewage prior to its entering the treating units proper, in order to avoid damage to pumps and other equipment and the deposit of inert material in the clarifiers and digesters along with the organic solids. Raw sewage frequently also contains considerable quantities of oily and greasy materials. The presence of these materials imposes a heavy burden on the biological processes, which the sewage or the sludge may undergo. It has, therefore, been usual to pass raw sewage carrying gritty and oily material through a grit chamber and a grease removal apparatus ahead of the primary clarifiers. It has also been suggested to separate grit and grease from sewage in combined grit and grease removal apparatus.

Our invention relates to improvements in a combined grit and grease separator.

Grit chambers are designed to provide a flow velocity sufficiently low to permit depositing of the grit, but sufficiently high to prevent deposition of the lighter organic matter. Theoretically, in a well designed grit chamber a clear separation between grit and the lighter organic solids should take place. In practice, however, due to the variations in sewage flow, it has frequently been found difficult to maintain a velocity providing such a classification. In our new apparatus we overcome these difficulties by providing a constant volume of liquid in our grit chamber, and subjecting it to agitation and circulation with a constant velocity suitable for deposit of grit but preventing deposit of organic matter. The throughflow is absorbed in this circulation. Variations in the throughput flow, therefore, do not materially affect the velocity through the grit chamber.

In the conventional grease removal units the sewage is subjected to air or vacuum flotation, the greasy material accumulating at the surface of the sewage from where it is usually removed by skimming. Grease flotation by air usually is effected either with compressed air, introduced through diffuser plates or tubes, or with atmospheric air introduced by mechanical aerators. Diffused air is usually provided progressively over a relatively long flow passage. This necessitates relatively large quantities of air, as each volume of air comes into contact only with the volume of sewage for which it is introduced. Mechanical aerators, on the other hand, are rather complicated and expensive apparatus. Moreover, the individual aerator introduces only a relatively small quantity of air so that, except in very small plants, several aerators are usually needed for effective grease flotation.

We suggest to effect grease flotation using compressed air in a novel manner. Instead of progressively aerating the sewage we introduce the air at one point of a tank through an ordinary inlet, and immediately break it up into fine bubbles and disperse it throughout a large body of sewage. The newly entering sewage is introduced and dispersed in the same manner. Thus each volume of air introduced comes into contact with a much larger quantity of sewage than is introduced per volume of air, and oil and grease from a large quantity of sewage have a chance to adhere to the minute bubbles dispersed therein and presenting a large surface. This dispersion of air and sewage is effected by means of a rotor, which is simple and cheap in construction and operation. The operation of this rotor subjects the sewage to a flow pattern favorable for coagulation of the lighter organic solids which are held in suspension, and for scouring the grit which settles from the sewage.

Except for the relatively small rotor, which takes care of the triple task of dispersing entering air and sewage, of coagulating the light solids and of scouring and separating the grit, the tank is free of all internal structure impeding flow. This provides a free rising space for the oil bearing air bubbles equivalent to the entire cross sectional area of the tank. Due to the favorable dispersion and rising conditions for the air, only a small amount of air is needed to separate relatively large quantities of grease and oil. Even this small quantity of air, however, helps to maintain, or set up, aerobic conditions favorable for subsequent clarification and biological treatment of the sewage.

Figure 2:
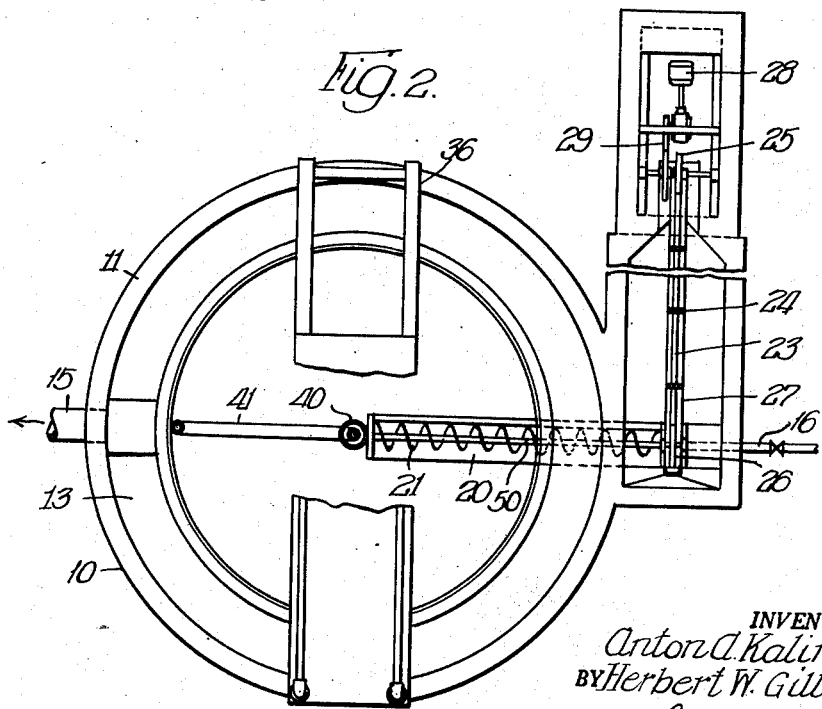

Our invention will be more fully understood by reference to the drawings, which form a part hereof and wherein:

Figure 1 is a vertical cross-sectional view of a preferred embodiment of the apparatus according to the invention, Figure 2 is a plan view of the same embodiment with the power mechanism omitted and parts broken away, and Figure 3 is a plan view of a combination of two grit chambers according to the invention.

The apparatus shown in Figures 1 and 2 comprises a tank or basin 10, which may be of any suitable shape and material, but which is shown for purposes of illustration as a cylindrical concrete tank. The tank 10 has a vertical wall 11 and a floor 12. The floor 12 preferably slopes toward the center of the tank, as shown, to facilitate dewatering and to prevent deposit of solids around the periphery of the tank and to assist in the movement of solids toward the center of the tank. A launder 13 in the upper portion of the tank 10 is provided with an effluent weir 14 over which the liquid flows into the launder 13. Liquid is withdrawn from the launder 13 through an effluent conduit 15. A valved drain 16 permits draining the tank 10 for inspection or repair.

A grit channel 20 extends radially across the floor 12 from adjacent its center to outside the tank. Any suitable means for removing grit from the channel 20 may be provided. For purposes of exemplification we have shown a helical screw 21 which operates in the channel 20 and moves the grit to the outer end of the pit outside the tank from where it is removed by suitable conveying means. Usually a grit elevating mechanism will be provided therefor to raise the grit from the outer end of the pit 20 to an elevation from where it can readily be hauled away for final disposal. Such a grit elevator 22 may be in the form of a flight conveyor comprising a chain 23 provided with blades 24, and operating over upper and lower sprockets 25 and 26. The flight conveyor is disposed in a sloping trough 27 and can be driven by any suitable means such as a motor 28, through a belt or chain 29. To simplify the construction the screw conveyor 21 and lower sprocket 26 may be mounted on a single shaft 50 so that operation of the flight conveyor also operates the screw conveyor. Such grit elevating mechanism are well known in the art and form no part of this invention.

Axially aligned in the lower portion of the tank 10 is a rotor 30. The rotor 30 comprises a horizontal plate 31 and a plurality of relatively long, narrow vertical blades 32 mounted on the underside of the plate 31. The blades 32 are uniformly spaced around the periphery of the plate 31 and extend inwardly therefrom only partway to the center of the plate. The plate 31 is rigidly affixed to a shaft 33, which is driven by a suitable motor-speed reducer 34. The motor 34 may be supported in any suitable manner, as on a walkway or beam 36 spanning the tank 10. The lower part of the shaft may be held in position by any suitable means such as a bearing 37, supported by bracing 38.

The sewage to be treated is introduced through inlet conduit 40 extending through the tank bottom 12 and discharging upwardly in the center of the tank. Air or oxygen under pressure are introduced through a pipe 41. The pipe 41 may discharge separately, adjacent the inlet conduit 40, or jointly with the inlet conduit 40, as shown, the important thing being that the air is discharged below the rotor 30, so that it has no chance of escaping to the liquid surface before it has been picked up by the rotor and mixed with the sewage in the tank.

The operation of the apparatus will be readily understood. Rotation of the rotor 30 causes a spiraling, 3-dimensional vortex flow in the lower portion of the tank, having an upper discharge flow outwardly from the rotor in all directions to the tank periphery and downwardly along the wall of the tank, and a lower inward suction flow along the bottom of the tank and upwardly back to the axis of the rotor. As the raw sewage, introduced through inlet conduit 40, and the air, introduced through air line 41, are discharged below the rotor 30 they are immediately picked up by, and dispersed throughout, this vortex flow. The air is broken up into fine bubbles to which small droplets of oil and particles of grease adhere, thus agglomerating into larger drops and particles which are floated to the surface by the air bubbles separating from the circulation.

The flow pattern set up by the rotor as well as the aeration of the sewage are very favorable for the agglomeration of floatable material and for coagulation of the lighter organic solids into larger particles which are more readily settleable, whereby both types of impurities can be readily removed in a subsequent clarifier. The grit is very efficiently scoured and washed free from oil and organic matter by the circulation described especially as it is rolled across the floor of the tank by the inward spiralling flow. Eventually, the clean grit will deposit in the channel 20 from where it is removed intermittently or continuously by the screw conveyor 21 and the flight conveyor 22.

Functionally the tank is divided into a lower agitation and circulation space and an overlying rising space, the two spaces being in unrestricted open communication over their entire cross sectional area. Air separates, therefore, from the circulation over the entire cross sectional area of the tank and rises through an appreciable depth of liquid to the surface. This free, unimpeded separation and rise of the air bubbles eliminates the danger of breaking up the agglomerates of oil and grease adhering to the bubbles.

The size of the tank relative to the throughput will vary with such factors as the characteristics of the liquid to be treated, the quantity of air used in the treatment, the results desired and the like. While we contemplate a normal detention time within the range of from about 5 to about 15 minutes, longer detention may be desirable or a shorter time may be sufficient under certain circumstances. Thus, for instance, when substantially complete coagulation of the organic solids is desired, or large quantities of grease are present, a longer detention time may be required.

The rotor must be carefully positioned and dimensioned relative to the basin. Since the vortex flow set up by it is to absorb the inflow of newly entering sewage, the pumping capacity of the rotor, at normal speed of rotation, must be considerably in excess of the throughput. While the vortex flow should embrace all the liquid in the lower agitation and circulation space of the tank, the agitation caused by it should be confined to this lower portion of the tank. Obviously the speed of rotation must be sufficiently low to permit the grit to settle from the circulating sewage to the bottom of the tank and sufficiently high to prevent settling of organic matter. A further consideration regarding the speed of the rotor is the proper dispersion of the air. This latter consideration necessitates a peripheral speed within the range of from about six to about eight feet per second. In view of this relatively high speed, a relatively small rotor is preferred. A rotor with a diameter of about one-eighth to one-tenth the width of the tank and a blade length of about one-half the rotor diameter rotated at the speed mentioned, causes a velocity in the outer portion of the tank and near the bottom, which does not interfere with the settling of the grit and maintains lighter solids in suspension. It will be understood that these proportions are not sharply critical and will also vary with such factors as the type of the liquid treated, the quantity of air introduced, and the results desired.

Due to the thorough dispersion of the air through a large quantity of sewage, a relatively small amount of air is ordinarily sufficient. Good results are obtained using from about one-tenth to about one-fourth cubic foot per gallon of throughput.

Obviously, the apparatus could be provided with conventional means for collecting and removing the oil and grease such as a scum baffle and skimmer, and we consider such a construction as within the scope of our invention. Ordinarily, however, we prefer to let the sewage carry the grease, along with the coagulated organic matter, to the clarifier, where the grease will form a floating surface layer, which can be removed along with other floating matter by the usual skimming devices, thus avoiding duplication of equipment.

In cases where two grit chambers are used, be it for simultaneous use or where one of the chambers is a standby, the construction of the grit chamber according to the invention permits using a single common grit removing mechanism serving both chambers. Such an arrangement is shown in Figure 3. The grit chambers 10a and 10b of this embodiment are the same as that shown in Figures 1 and 2 and need not be described in detail. However, in this embodiment the outer end of grit channel 20a of grit chamber 10a and the outer end of grit channel 20b of grit chamber 10b are joined to form a common trough 20c intermediate the two basins from which grit is removed by the elevator mechanism 22a. The helical screw 21a operating in grit channel 20a and the helical screw 21b operating in grit channel 20b are on a common shaft 50a, one of the screws such as 21a having a right hand thread, and the other such as 21b a left hand thread.

The grit elevator 22a, which is the same as in Figure 1, is placed between the two chambers 10a and 10b and has its lower sprocket 26a mounted on the shaft 50a between the screws 21a and 21b. Obviously, rotation of the shaft 50a by the sprocket 26a will rotate the screws 21a and 21b in opposite directions to move grit from the grit channels 20a and 20b into the trough 20c from where it is raised by the flight conveyor. It will be obvious that this construction permits considerable savings in cost of equipment and operation.

Many modifications of the embodiment shown for exemplification and illustration could be made without departing from the scope and spirit of the invention. Accordingly, we do not wish to limit ourselves to the exact structural details shown and described herein.

We claim:

1. An apparatus for separating grit and grease from a flowing stream of sewage comprising a tank free of internal structure limiting horizontal or vertical flow, an overflow adjacent to the top of the tank, a grit channel in the floor of the tank, means for removing grit from said channel, a rotor axially aligned in the lower portion of said tank, said rotor comprising a horizontal plate and a plurality of vertical blades mounted on the underside of said plate and extending inwardly from the periphery of said plate partway to its center, the diameter of said plate being a minor portion only of the diameter of said tank, means for rotating said rotor to provide a peripheral velocity of said rotor of from about six to about ten feet per second, an inlet conduit for sewage to be treated, and an inlet conduit for air under pressure, said conduits discharging underneath said plate.

2. Apparatus for treating sewage to separate grit and grease therefrom and to retain and coagulate organic solids therein, comprising a tank free of internal structure limiting horizontal and vertical flow and of sufficient depth to provide a circulation space in the lower portion of said tank and a superposed rising space in open communication with said circulation space, an overflow from the upper portion of said tank, a grit channel in the floor of said tank, means for removing grit from said grit channel, a rotor of the radial flow type and including a horizontal plate axially aligned in said circulation space, the diameter of said plate being from about one-eighth to about one-tenth the diameter of said tank, means for rotating said rotor to provide a peripheral speed of the rotor of from about six to about ten feet per second, said rotor setting up in said circulation zone a three-dimensional vortex flow including an upper radial discharge flow spiralling outwardly to the wall of said tank and downwardly to the floor of the tank and a lower radial suction flow spiralling inwardly across the floor of the tank and upwardly to the axis of said rotor, inlet means for sewage discharging into the suction flow of said rotor, and an inlet conduit for air under pressure discharging underneath said plate.

3. Apparatus for separating grit and grease from a flowing stream of sewage comprising a pair of tanks, an overflow from each tank, a rotor of the radial flow type axially aligned in the lower portion of each tank, each rotor including a horizontal plate and vertical blades mounted on the lower side of the plate, the diameter of each of said plates being a minor portion only of the diameter of its tank, means for rotating said rotors with a peripheral speed of from about six to about ten feet per second, an inlet for sewage to be treated into each tank and discharging into the suction of the respective rotor, means for delivering air under pressure in each tank directly underneath the plate of the respective rotor, a grit channel across the bottom of each tank and extending to outside the tank, the outer ends of said grit channels being joined together, a single continuous shaft extending in said grit channels, opposed helical screws affixed to opposite portions of said shaft, grit conveying means including a sprocket affixed to said shaft intermediate said screws, and means for driving said sprocket.

4. Apparatus for separating grit and grease from liquid including a tank free of internal structure limiting horizontal and vertical flow, an outlet from the upper portion of said tank, inlet means for the liquid to be treated, means for removing grit from the floor of said tank, a rotor axially aligned in said tank, said rotor comprising a horizontal plate and a plurality of vertically extending blades mounted on the underside of said plate and extending inwardly from the periphery of said plate only partway to its center, and motor means for rotating said rotor, characterized in that said rotor is mounted in the lower portion of said tank remote from said outlet, and is rotated by said motor means with a peripheral speed of from about six to about eight feet per second, the diameter of said plate being a minor portion only of the diameter of said tank, and in that said liquid inlet means discharge into the suction of said rotor, and in that an inlet for gas under pressure discharges into said tank below, and within the horizontal confines of, said plate.

References Cited in the file of this patent
UNITED STATES PATENTS

| Number | Name | Date |
|---|---|---|
| 1,703,041 | Imhoff | Feb. 19, 1929 |
| 1,717,223 | Karlstrom | June 11, 1929 |
| 2,274,658 | Booth | Mar. 3, 1942 |
| 2,425,932 | Green et al. | Aug. 19, 1947 |
| 2,506,927 | Kelly | May 9, 1950 |